(12) United States Patent
Kajio et al.

(10) Patent No.: US 8,408,621 B2
(45) Date of Patent: Apr. 2, 2013

(54) ASSIST GRIP

(75) Inventors: Hideki Kajio, Toyota (JP); Daisuke Kogiso, Ena (JP)

(73) Assignees: Howa Plastics Co., Ltd., Toyota-Shi, Aichi-Ken (JP); Toyoda Gosei Co., Ltd., Toyota-Shi, Aichi-Ken (JP)

( * ) Notice: Subject to any disclaimer, the term of this patent is extended or adjusted under 35 U.S.C. 154(b) by 0 days.

(21) Appl. No.: 13/060,856

(22) PCT Filed: Oct. 4, 2010

(86) PCT No.: PCT/JP2010/067355
§ 371 (c)(1),
(2), (4) Date: Feb. 25, 2011

(87) PCT Pub. No.: WO2012/046287
PCT Pub. Date: Apr. 12, 2012

(65) Prior Publication Data
US 2012/0080898 A1    Apr. 5, 2012

(51) Int. Cl.
*B60N 3/02* (2006.01)
(52) U.S. Cl. .................. 296/1.02; 16/110.1; 16/429
(58) Field of Classification Search ............ 296/1.02; 16/110.1, 429
See application file for complete search history.

(56) References Cited

U.S. PATENT DOCUMENTS
2003/0234549 A1* 12/2003 Totani et al. ............ 296/1.02

FOREIGN PATENT DOCUMENTS
| GB | 2461111 A | 12/2009 |
| JP | 5-69407 U | 9/1993 |
| JP | 2008-296677 A | 12/2008 |

OTHER PUBLICATIONS

International Search Report mailed on Dec. 28, 2010 for the corresponding International patent application No. PCT/JP2010/067355 (Japanese language).

* cited by examiner

*Primary Examiner* — Glenn Dayoan
*Assistant Examiner* — Melissa A Black
(74) *Attorney, Agent, or Firm* — Ingrassia Fisher & Lorenz, P.C.

(57) ABSTRACT

A grip body (1) of an assist grip includes hinge bodies (21, 31) provided in hinge cavities (11, 12) on bases provided at opposite left and right ends, and the hinge bodies (21, 31) are pivotally connected to the hinge cavities (11, 12) at opposite sides via pivot shafts. A mounting clip (5) having spring resiliency is inserted into a rectangular opening (27, 37) provided substantially at the center of the hinge body (21, 31), and a cover (4) is assembled by inserting a clip support portion (42) into the inside of resilient legs at both sides of the mounting clip (5) so as to cover the front of the hinge body (21, 31). Between the cover (4) and the hinge body (21, 31), a guide groove (21c, 31c) and a guide rib (44) are provided so as to be fitted together and slidingly contact along a push-in direction of a part where the hinge member and the cover slidingly contact when the cover (4) is pushed.

3 Claims, 20 Drawing Sheets

ASSIST GRIP

TECHNICAL FIELD

The present invention relates to an assist grip to be mounted on a ceiling surface or the like inside a vehicle compartment, and more particularly, to an assist grip a grip body of which is secured to a mounting location inside the vehicle in a rotatable fashion via a hinge assembly.

BACKGROUND ART

Assist grips are installed on a ceiling surface inside a vehicle compartment to provide a support for vehicle occupants in the compartment. This kind of assist grips having such a structure that hinge cavities are formed at opposite sides of a grip body and hinge assemblies are installed in the hinge cavities in a rotatable fashion, and the grip body is rotatably mounted via the hinge assemblies provided at opposite sides have been used in various automobiles.

As disclosed in Patent Literature 1 shown below, this assist grip includes on the hinge assemblies at opposite sides thereof mounting clips made of metal, and is mounted by the mounting clips so as to be secured to a body panel of a vehicle body. The mounting clip is formed of a metal having spring resiliency into a substantially U-shape, and fitted into a hinge body so as to cover a center support plate of the hinge body of the hinge assembly. Thereafter, the hinge body is provisionally assembled from the front side thereof with a cover by inserting a clip support portion thereof into the inside of the mounting clip.

For mounting on the vehicle body, there is a structure of, first, fitting the mounting clips into rectangular holes formed on the body panel of the vehicle body to engage engaging portions of bulging portions provided at both sides of each of the mounting clips with the periphery of the rectangular hole of the body panel, and then pushing the provisionally assembled cover into the hinge body from the front to the back side, thereby pushing the clip support portion into the inside of the mounting clip to make the resilient bulging portions of the mounting clip bulge laterally, for securing the assist grip to the vehicle body.

Citation List
Patent Literature
   Patent Literature: JP2009-121633 A

SUMMARY OF INVENTION

Technical Problem

However, when pushing the provisionally assembled cover into the hinge body from the front to the back side, the cover sometimes inclines with respect to the hinge body, and if the cover in an inclined state is pushed into the hinge body, the cover is locked in the middle of insertion, which prohibits the cover from entering up to an appropriate position of the hinge body. Therefore, there has been a problem that if such a phenomenon occurs during assembly of an assist grip onto a vehicle body, the assist grip can no longer be appropriately mounted onto the vehicle body.

The present invention has been made in view of the above problems, and an object thereof is to provide an assist grip that, when pushing a cover into a hinge body to assemble a hinge assembly to a vehicle body, allows the assembly by making the cover to appropriately enter into the hinge body.

Solution to Problem

In order to achieve the above object, an assist grip of the present invention includes:

a grip body including hinge cavities on bases provided at opposite left and right ends;

hinge assemblies including a pair of hinge bodies to be pivotally connected to the hinge cavities at opposite sides via pivot shafts;

mounting clips each formed by bending a metal having spring resiliency into a substantially U-shape and with resilient legs provided at both sides, the resilient legs at both sides including resilient bulging portions bulging outward, and the mounting clips to be respectively inserted into rectangular openings provided substantially at the center of the pair of hinge bodies; and covers each including a clip support portion to be inserted into the inside of the resilient legs at both sides of the mounting clip, and to be fitted to the hinge body so as to cover a front surface of the hinge assembly, the cover being assembled to the hinge body by pushing from the front to the back side, characterized in that a guide groove and a guide rib are provided so as to be fitted together and slidingly contact along a push-in direction of a part where the hinge member and the cover slidingly contact when the cover is pushed into the hinge body.

According to the invention, when pushing the cover into the hinge body, since the cover is pushed into the hinge body in an upright state without inclination with respect to the hinge body due to fitting and sliding contact of the guide groove and the guide rib, the cover is not locked in the middle of insertion, which allows the cover to enter up to an appropriate position in the hinge body. The cover can thus be appropriately fitted into the hinge body to assemble the assist grip to the vehicle body easily and appropriately.

Here, in the above-described assist grip, it is preferable that the guide groove is formed along a push-in direction on an inner side surface of a rectangular frame of the hinge body, and the guide rib is formed on a side surface of the clip support portion of the cover or an inner side surface of a cover main body of the cover.

According to the invention, by providing a guide groove on an inner side surface of a rectangular frame of a hinge body with a relatively high strength, the assembling workability of the cover can be improved by the guide groove and guide rib, with necessary strength in the hinge body and the cover retained.

Moreover, in the above-described assist grip, it is preferable that the guide grooves are formed along a push-in direction on both inner side surfaces of a rectangular frame of the hinge body, and the guide ribs are formed on both side surfaces of the clip support portion of the cover or both inner side surfaces of a cover main body of the cover.

According to the invention, since guide grooves and guide ribs to be fitted with the guide grooves are provided at both sides, the sliding stability of the cover when pushing the cover into the hinge body can be increased.

Moreover, the above-described assist grip can be configured such that a first retention portion in a bent shape and a second retention portion in a flat plate shape are provided at a leading end of the resilient bulging portion of the mounting clip, and when the hinge body with the mounting clip is fitted into a rectangular hole provided on a body panel of a vehicle body, and the first retention portion is retained by a periphery of the rectangular hole of the body panel, and a leading end of the second retention portion is retained by a back of the body panel.

According to the invention, when the hinge assembly with the mounting clip is fitted into the rectangular hole of the vehicle body panel, the first retention portion is retained by the periphery of the rectangular hole of the body panel, while a leading end of the second retention portion is retained by the back of the body panel, so that the pull-out retention of the hinge assembly with the mounting clip can be extremely increased so as to enhance the assembling strength of the assist grip.

Advantageous Effects of Invention

According to the assist grip of the present invention, when pushing the cover into the hinge body to assemble the hinge assembly to the vehicle body, the cover is appropriately fitted into the hinge body for the assembly, so that assembling workability of the assist grip can be improved.

BRIEF DESCRIPTION OF DRAWINGS

FIG. 20 show another embodiment, in which

DESCRIPTION OF EMBODIMENTS

Figure 1:
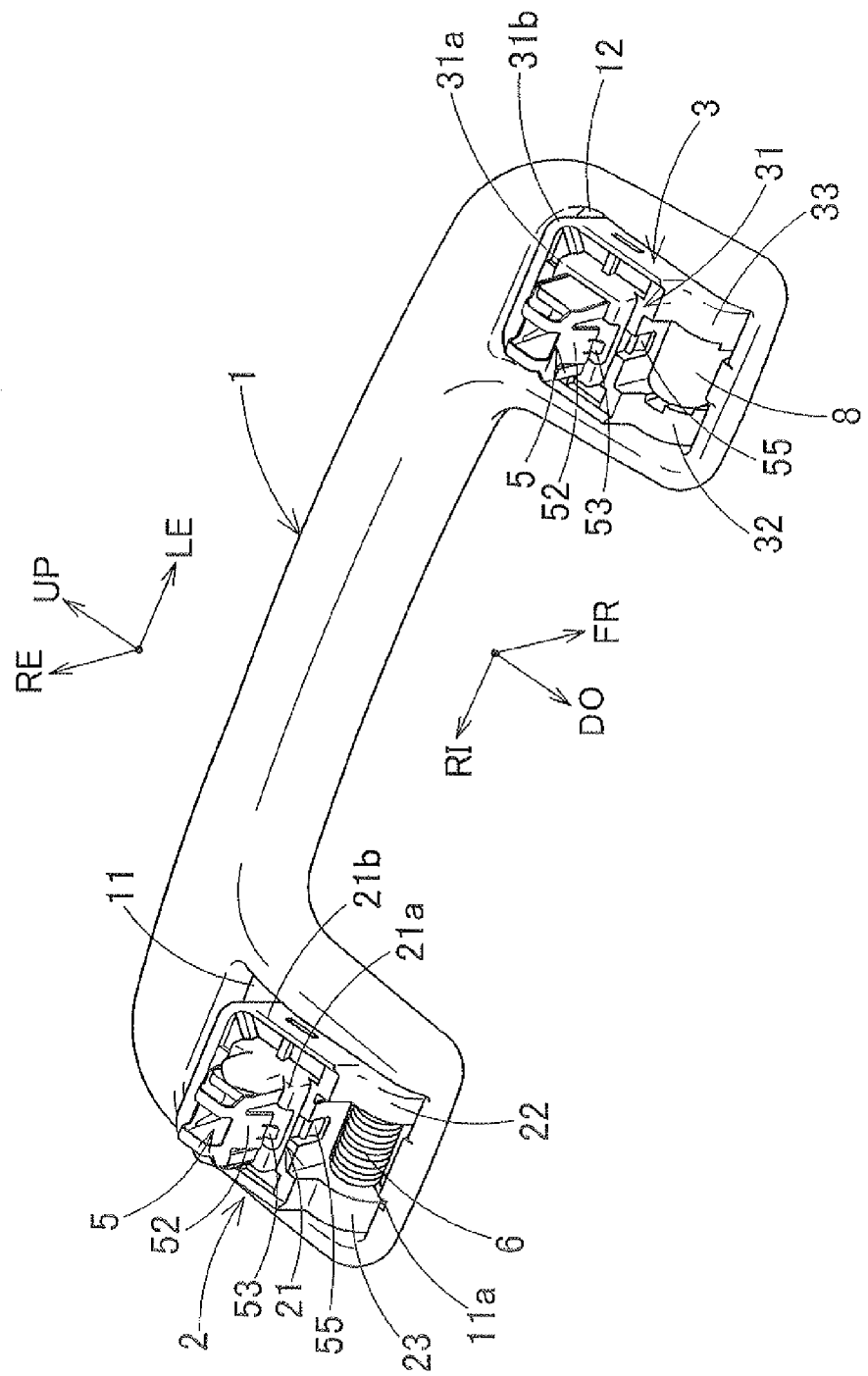
FIG. 1 is a perspective view of an assist grip as viewed from the back showing an embodiment of the present invention.
Figure 2:
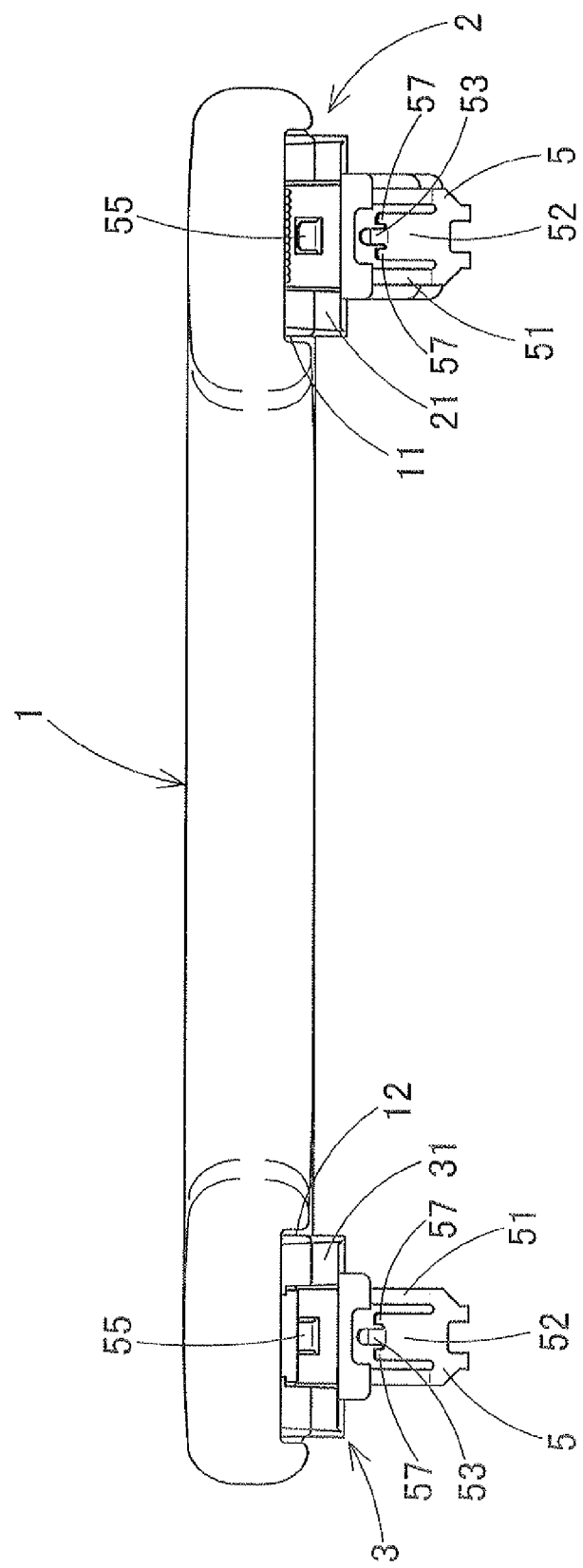
FIG. 2 is a bottom view of the assist grip.
Figure 3:
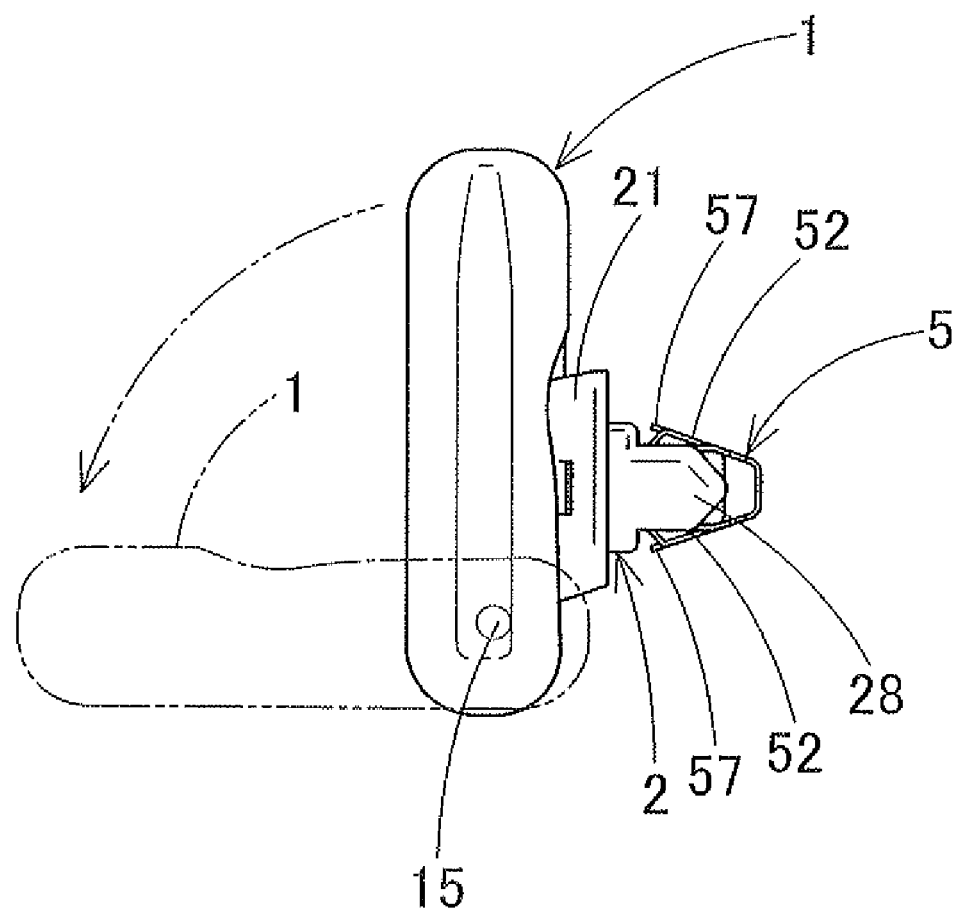
FIG. 3 is a right side view of the assist grip.
Figure 4:
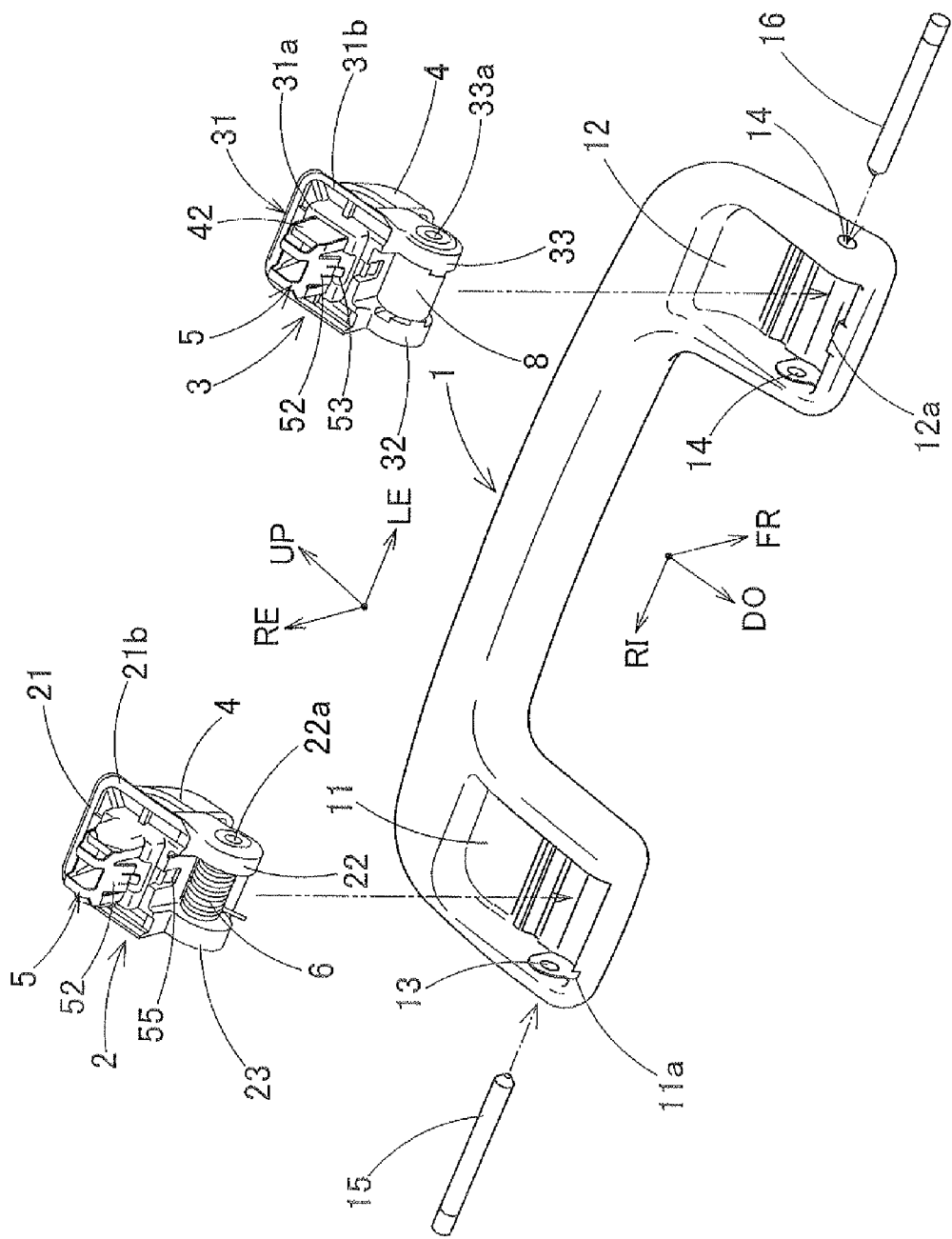
FIG. 4 is an exploded perspective view of the assist grip as viewed from the back.

Hereinafter, an embodiment of the present invention will be described with reference to the drawings. FIG. 1 shows a perspective view of an assist grip as viewed from the back, FIG. 2 shows a bottom view thereof, FIG. 3 shows a right side view thereof, and FIG. 4 shows an exploded perspective view thereof. In addition, left, right, up, and down to be used in the following description refer to left, right, up, and down of an assist grip in a mounted posture as viewed from the front, and "FR," "LE," "RI," "UP," "RE," and "DO" used in the illustration refer to front, left, right, up, rear, and down, respectively.

In FIG. 1 to FIG. 4, reference numeral 1 denotes a grip body integrally molded of a synthetic resin, and the grip body 1 includes on the back of bases provided at opposite left and right ends thereof substantially rectangular hinge cavities 11, 12, respectively. At both left and right side wall portions inside the hinge cavities 11, 12 located at opposite sides, shaft holes 13, 14 are formed, respectively, and pivot shafts 15, 16 are respectively inserted through the shaft holes 13, 14 on the side wall portions as well as shaft holes 22a and 23a, 32a and 33a provided on inner supports 22, 32 and outer supports 23, 33 of hinge assemblies 2, 3, respectively, so that the respective hinge assemblies 2, 3 are pivotally supported relative to the grip body 1. A pair of the hinge assemblies 2, 3 are secured to a vehicle body of an automobile, and the grip body 1 is made rotatable between a non-use state and an in-use state relative to the hinge assemblies 2, 3.

Figure 5:
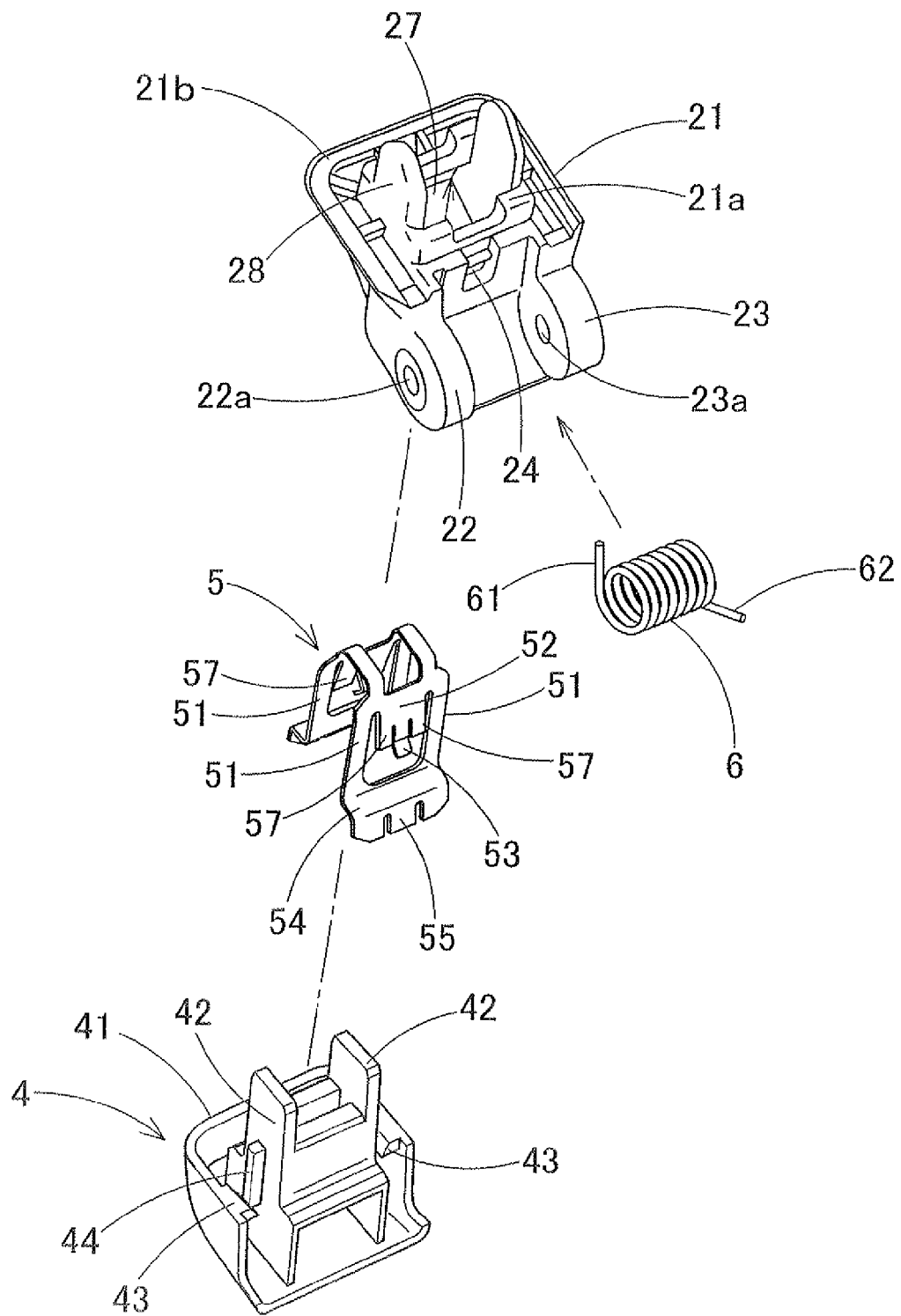
FIG. 5 is an exploded perspective view of a right hinge assembly 2 as viewed from the back.
Figure 6:
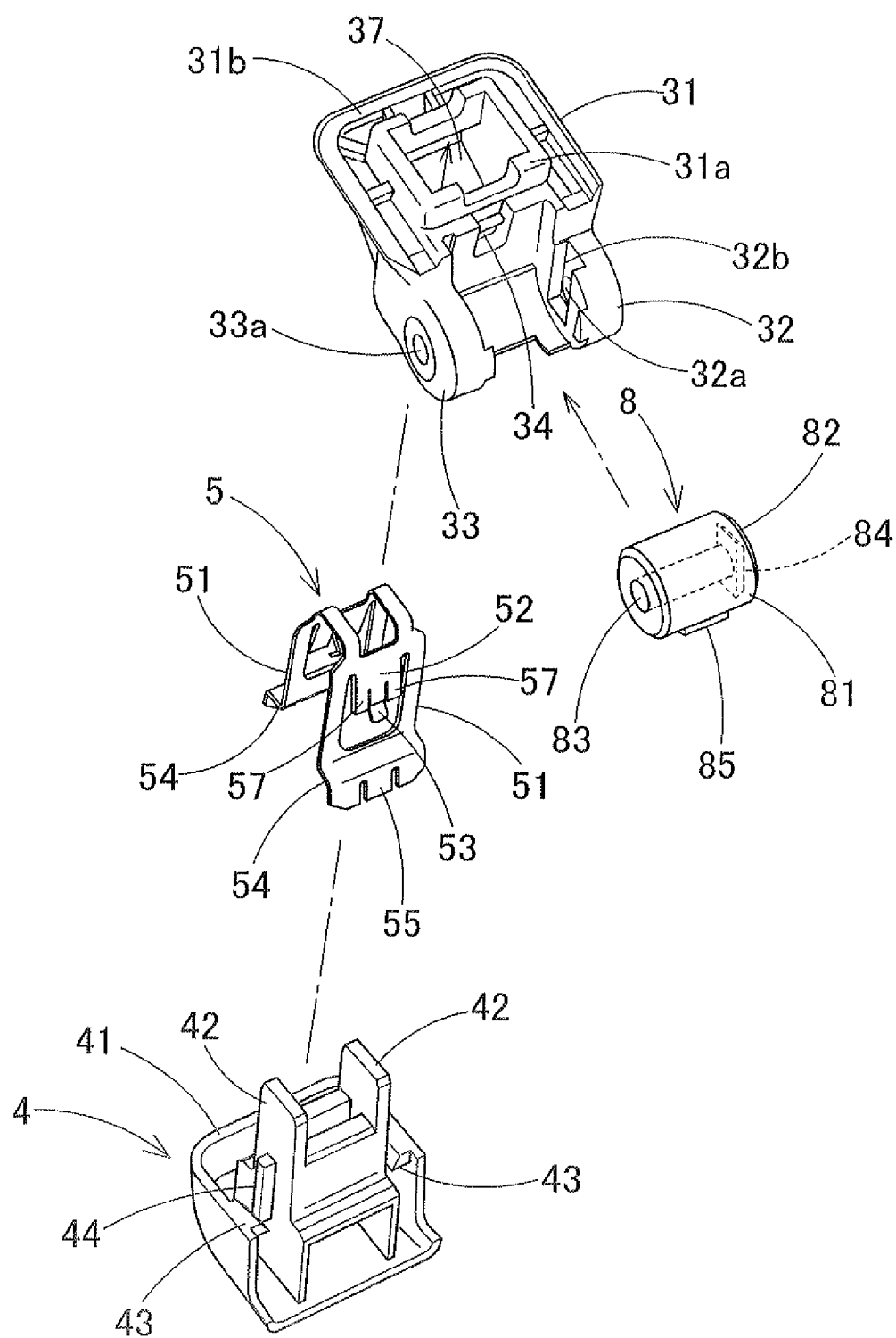
FIG. 6 is an exploded perspective view of a left hinge assembly 3 as viewed from the back.

As shown in FIG. 4, FIG. 5, and FIG. 6, the right hinge assembly 2 includes a hinge body 21, a mounting clip 5 that is mounted by being fitted into the hinge body 21 from its front side, and inserted and engaged with a rectangular hole (not shown) on a vehicle body panel, a cover 4 that is fitted to the hinge body 21 so as to cover its front side and makes a clip support portion 42 enter into a rectangular opening 27 in the hinge body 21 to support the mounting clip 5 from inside, and a torsion coil spring 6 that is mounted between the inner support 22 and the outer support 23 provided in a projecting manner at a lower portion of the hinge body 21.

Similarly, the left hinge assembly 3 includes a hinge body 31, a mounting clip 5 that is mounted by being fitted into the hinge body 31 from the front side, and inserted and engaged with a rectangular hole (not shown) on a vehicle body panel, a cover 4 that is fitted to the hinge body 31 so as to cover its front side and makes a clip support portion 42 enter into a rectangular opening 37 in the hinge body 31 to support the mounting clip 5 from inside, and an oil damper 8 that is inserted between the inner support 32 and the outer support 33 provided in a projecting manner at a lower portion of the hinge body 31, and applies a rotational load to the grip body 1.

The hinge body 21 of the right hinge assembly 2 is, as shown in FIG. 5, FIG. 7(a) to FIG. 7(c), and FIG. 8(a) and FIG. 8(b), formed into a cubic shape that is substantially quadrate in front view, and integrally molded of a synthetic resin with the inner support 22 and the outer support 23 provided in a projecting manner at a lower portion thereof. The hinge body 21 includes between the inner support 22 and the outer support 23 a space for the torsion coil spring 6, and a rectangular opening 27 is provided substantially at a central part of the hinge body 21. The hinge body 21 further includes at the back side of the rectangular opening 27 a rectangular frame 21a provided in a projecting manner, and a seat portion 21b formed at a part around and one step lower than the rectangular frame 21a, for inserting the rectangular frame 21a into the rectangular hole of the body panel and abutting the seat portion 21b against the surface of the body panel when fitting the hinge body 21 into the rectangular hole.

The inner support 22 and the outer support 23 provided in a projecting manner at the lower side of the hinge body 21 include shaft holes 22a, 23a formed as through-holes, respectively. There is a structure where a pivot shaft 15 is inserted through the shaft holes 22a, 23a (FIG. 4), for pivotally supporting the hinge body 21 inside the hinge cavity 11 of the grip body 1. As in FIG. 7(a) to FIG. 7(c) and FIG. 8(a) and FIG. 8(b), the hinge body 21 is formed at both sides with cover engaging portions 29, with which engaging pawls 43 provided at the inner side of the cover 4 are engaged when the cover 4 is fitted to the front side of the hinge body 21 as described below. Moreover, the rectangular opening 27 formed substantially at a central portion of the hinge body 21 is, as shown in FIG. 5, formed in a shape to allow insertion of the mounting clip 5 to be described later from its back side, and is formed in a shape to allow insertion of the clip support portion 42 provided in a projecting manner on the back side of the cover 4 when the cover 4 is fitted. Moreover, as shown in FIG. 7(a) to FIG. 7(c) and FIG. 8(a) and FIG. 8(b), the hinge body 21 includes at one inner surface of the rectangular opening 27 a guide groove 21c formed along a front and rear direction, that is, along an inserting direction of the cover 4, so that a guide rib 44 provided at one side surface of the clip support portion 42 of the cover 4 is fitted with the guide groove 21c to slide in contact.

Figure 7A:
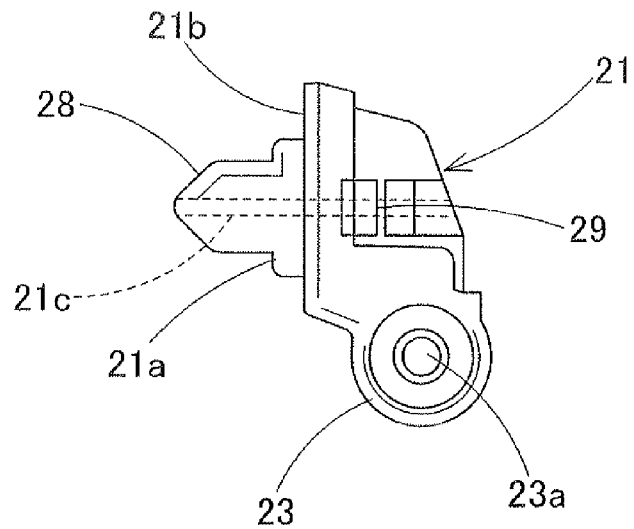
FIG. 7(a) is a right side view of a hinge body 21 of the hinge assembly 2.
Figure 7B:
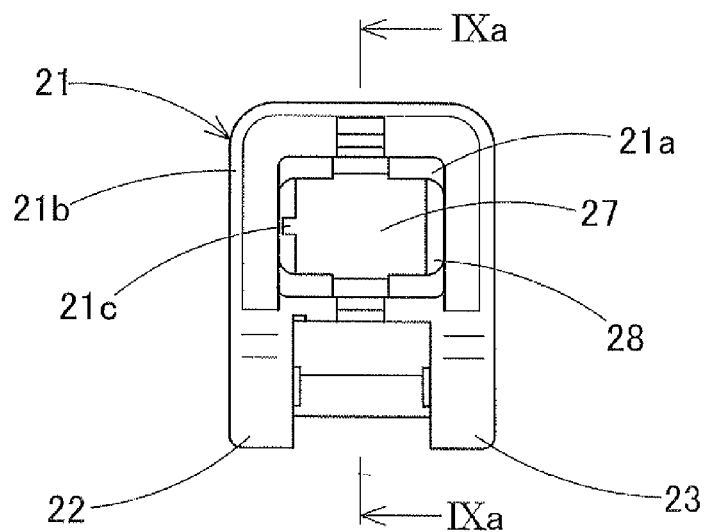
FIG. 7(b) is a rear view of the hinge body 21.
Figure 7C:
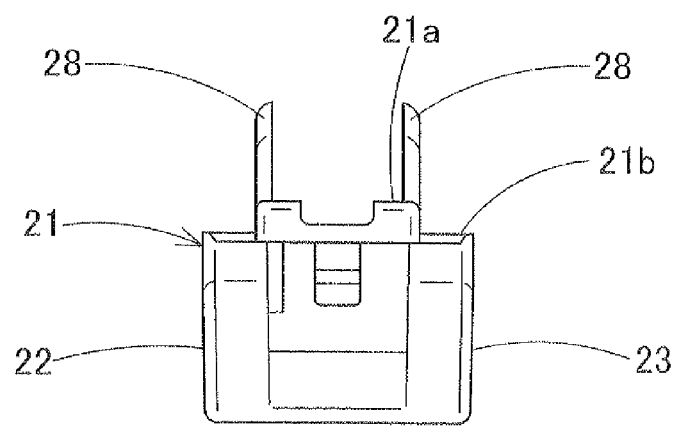
FIG. 7(c) is a plan view of the hinge body 21.
Figure 8A:
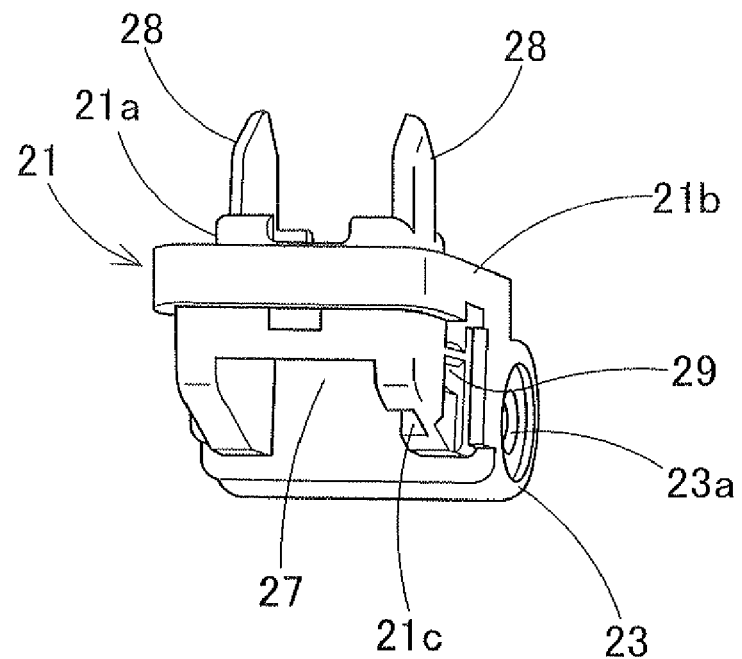
FIG. 8(a) is a perspective view of the hinge body 21 as viewed from upper front.
Figure 8B:
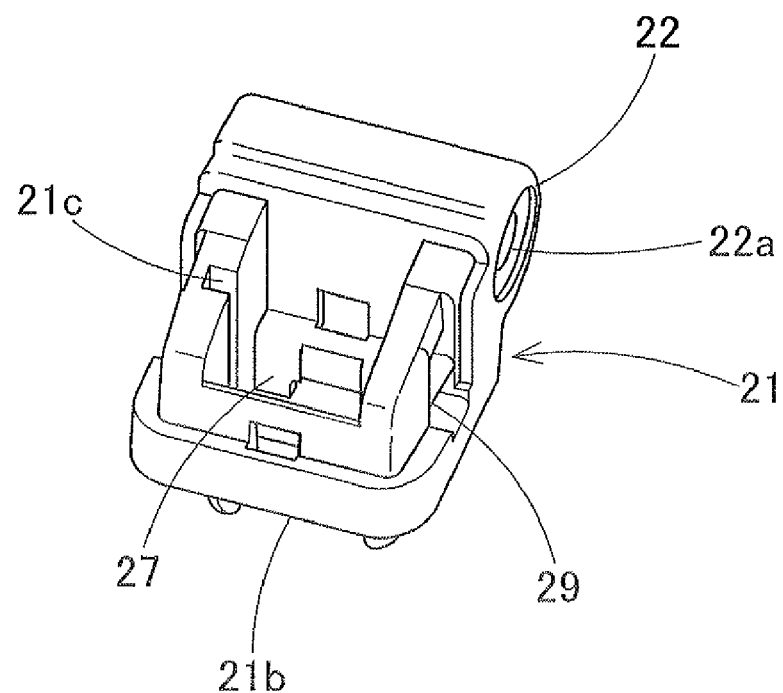
FIG. 8(b) is a perspective view of the hinge body 21 as viewed from a different angle.
Figure 9A:
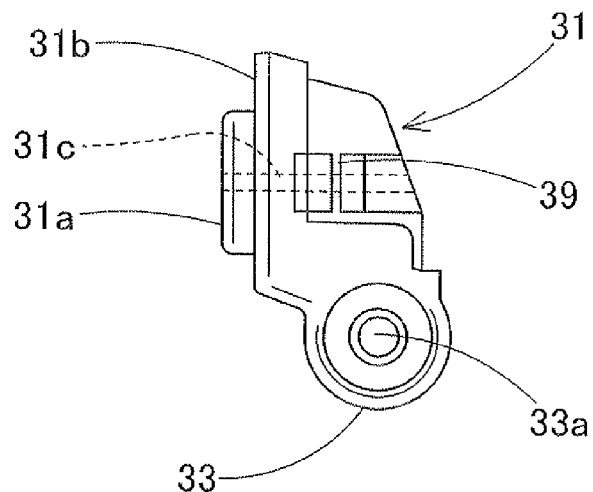
FIG. 9(a) is a right side view of a hinge body 31 of the hinge assembly 3.
Figure 9B:
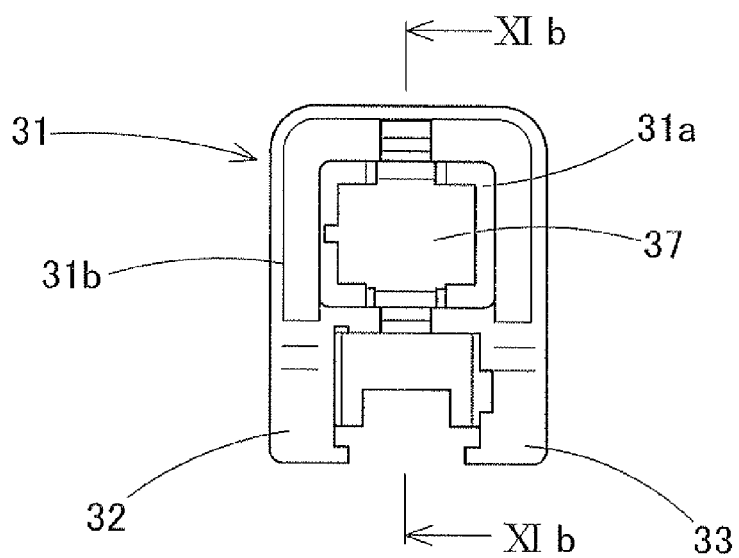
FIG. 9(b) is a rear view of the hinge body 31.
Figure 9C:
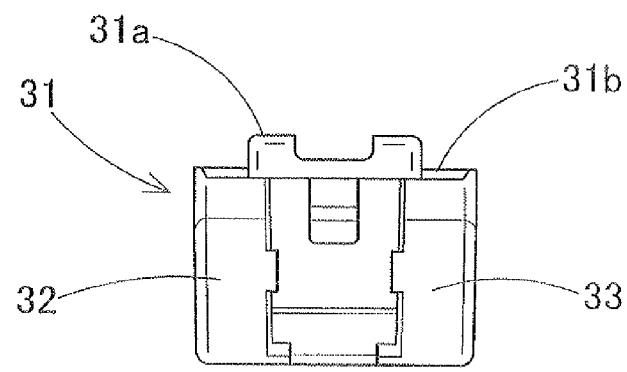
FIG. 9(c) is a plan view of the hinge body 31.
Figure 10A:
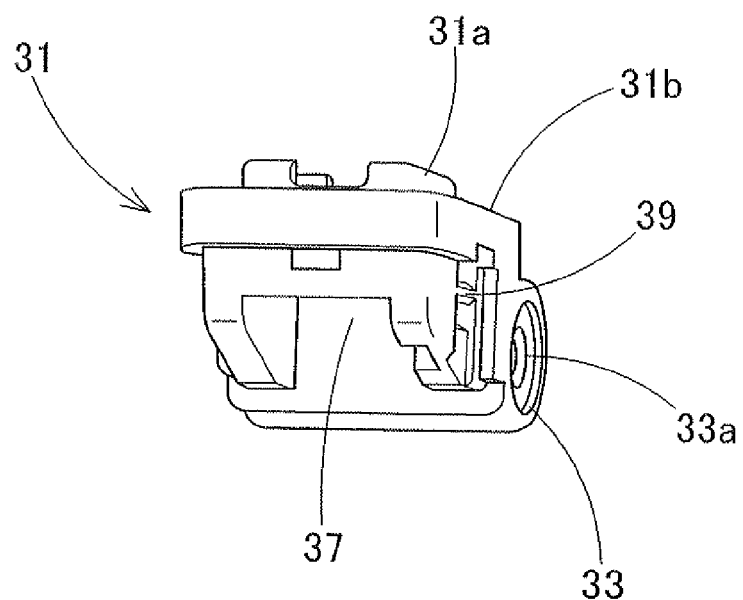
FIG. 10(a) is a perspective view of the hinge body 31 as viewed from upper front.
Figure 10B:
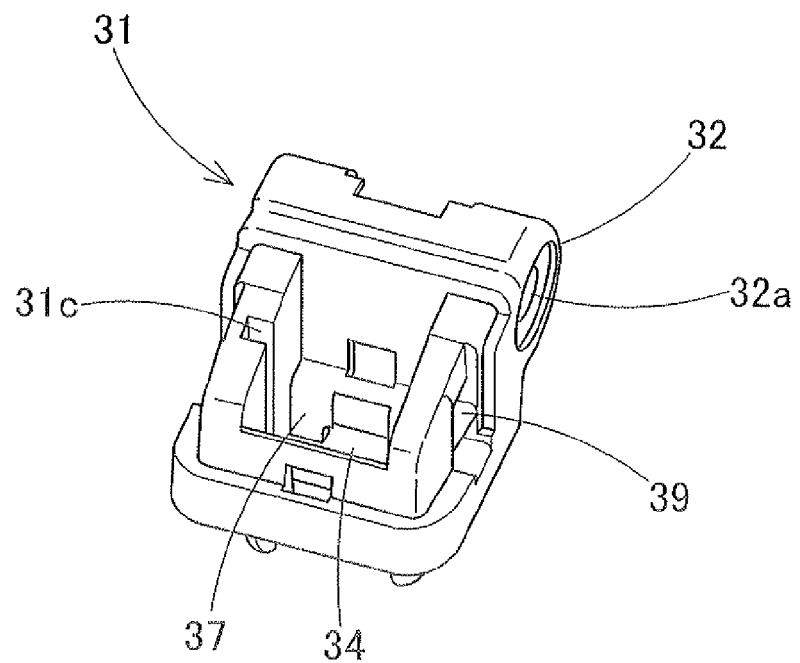
FIG. 10(b) is a perspective view of the hinge body 31 as viewed from a different angle.
Figure 11A:
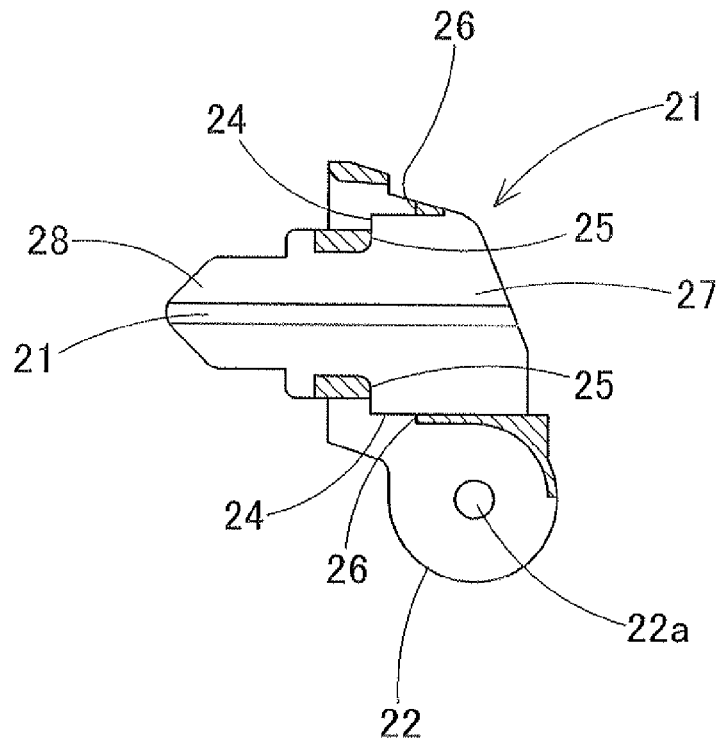
FIG. 11(a) is a sectional view taken along line XIa-XIa of FIG. 7(b)

As shown in FIG. 11(a), the hinge body 21 further includes at both inner sides of the rectangular opening 27 inner peripheral regions 25 provided projecting inward, in order to retain stepped regions 54 of the mounting clip 5 to be described later. Moreover, holes 24 are formed at the front side of the inner peripheral regions 25, and holding regions 26 are formed at the front side of the holes 24 and at both inner sides of the rectangular opening 27 so as to hold retaining pawls 55 of the mounting clip 5. In addition, as shown in FIG. 7(a) to FIG. 7(c), etc., the hinge body 21 includes at both sides of the rectangular opening 27 projections 28 provided projecting to the back side, so that when the hinge body 21 is fitted into the rectangular hole of the body panel for assembly, the outer surfaces of the projections 28 contact both left and right edges of the rectangular hole to prevent the hinge body and the grip body 1 from rattling in a left and right direction.

As shown in FIG. 4, FIG. 6, and FIG. 9(a) to FIG. 9(c), almost similar to the right hinge body 21 described above, the hinge body 31 of the left hinge assembly 3 is formed into a cubic shape that is substantially quadrate in front view, and integrally molded of a synthetic resin with the inner support 32 and the outer support 33 provided in a projecting manner at a lower portion thereof. The hinge body 31 includes between the inner support 32 and the outer support 33 a space for the oil damper 8, and a rectangular opening 37 is provided substantially at a central part of the hinge body 31. The hinge body 31 further includes at the back side of the rectangular opening 37 a rectangular frame 31a provided in a projecting manner, and a seat portion 31b formed at a part around and one step lower than the rectangular frame 31a, for inserting the rectangular frame 31a into the rectangular hole of the body panel so as to abut the seat portion 31b against the surface of the body panel when fitting the hinge body 31 into the rectangular hole.

Figure 16A:
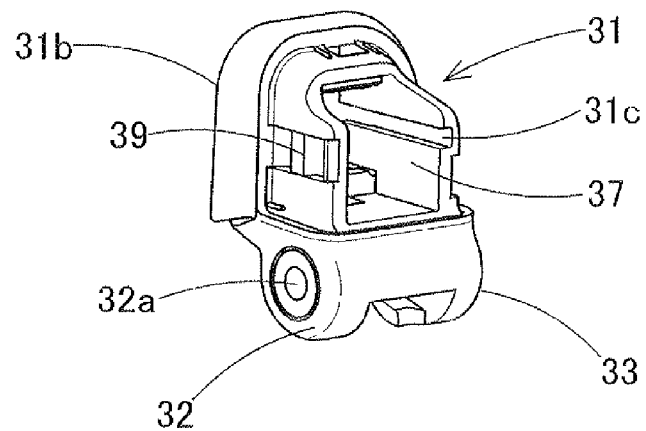
FIG. 16(a) is a perspective view of a hinge body.
Figure 16B:
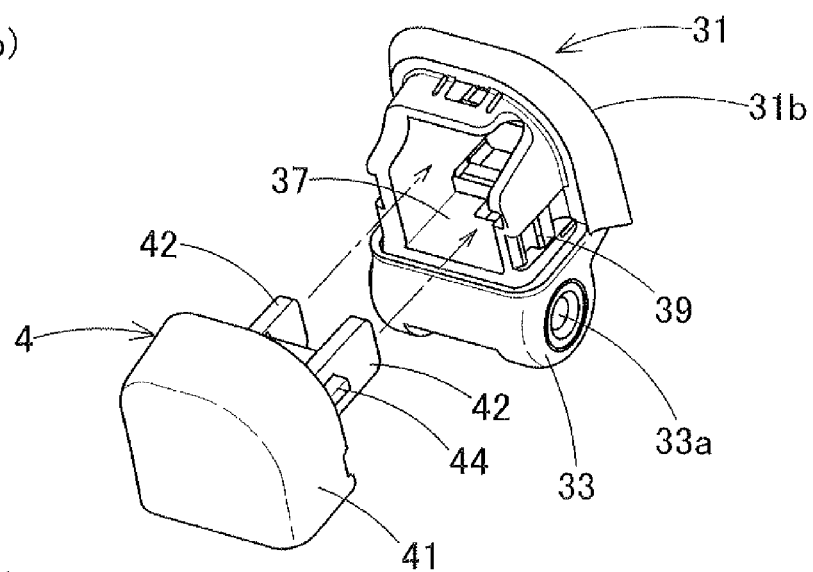
FIG. 16(b) is a perspective view of the hinge body and the cover.
Figure 16C:
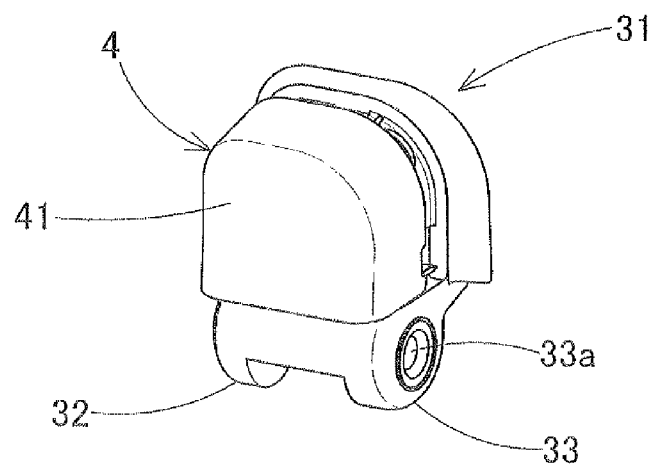
FIG. 16(c) is a perspective view of the cover in a provisionally assembled state relative to the hinge body.

As shown in FIG. 4, FIG. 6, and FIG. 9(a) to FIG. 9(c), the inner support 32 and the outer support 33 provided in a projecting manner at the lower portion of the hinge body 31 include shaft holes 32a, 33a formed as through-holes, respectively. This is a structure where a pivot shaft 16 is inserted through the shaft holes 32a, 33a, for pivotally supporting the hinge body 31 inside the hinge cavity 12 of the grip body 1. As in FIG. 9(a) to FIG. 9(c), and FIG. 10(a) and FIG. 10(b), the hinge body 31 is formed at both sides with cover engaging portions 39, with which engaging pawls 43 on the cover 4 are engaged when the cover 4 is fitted to the front side of the hinge body 31. Moreover, the rectangular opening 37 formed substantially at a central portion of the hinge body 31 is, as shown in FIG. 6, formed in a shape to allow insertion of the mounting clip 5 from its back side, and is formed in a shape to allow insertion of the clip support portion 42 provided in a projecting manner on the back side of the cover 4 when the cover 4 is fitted. Moreover, on one inner surface of the rectangular opening 37 of the hinge body 31, as shown in FIG. 16(a) to FIG. 16(c), a guide groove 31c is formed along a front and rear direction, that is, along an inserting direction of the cover 4, so that a guide rib 44 provided at one side surface of the clip support portion 42 of the cover 4 is fitted with the guide groove 31c to slide in contact.

Figure 11B:
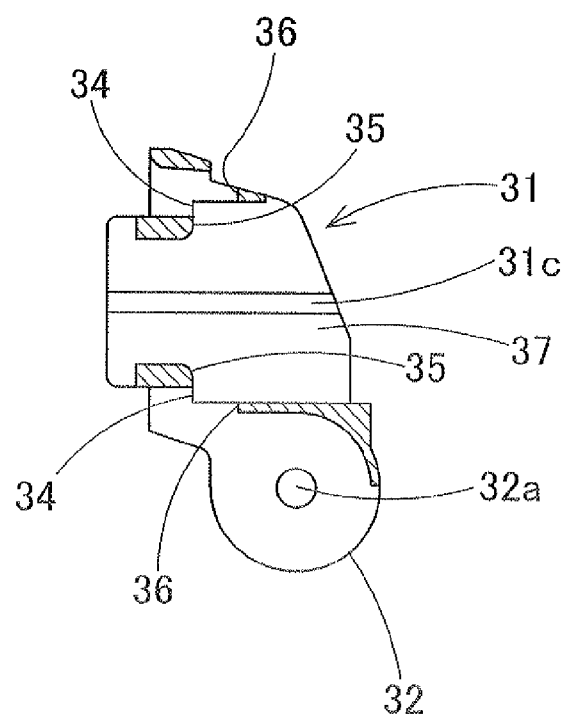
FIG. 11(b) is a sectional view taken along line XIb-XIb of FIG. 9(b).

As shown in FIG. 11(b), the hinge body 31 further includes at both inner sides of the rectangular opening 37 inner peripheral regions 35 provided projecting inward by which stepped regions 54 of the mounting clip 5 are retained. Moreover, holes 34 are formed at the front side of the inner peripheral regions 35, and holding regions 36 are formed at the front side of the holes 34 and at both inner sides of the rectangular opening 37 so as to hold retaining pawls 55 of the mounting clip 5.

As shown in FIG. 7(a) to FIG. 7(c) to FIG. 10(a) and FIG. 10(b), unlike conventional hinge bodies, the hinge bodies 21, 31 have a structure without center support plates provided in the rectangular openings 27, 37, but having the whole openings open, which thus allows simplifying the structure of a mold for the hinges 21, 31, thereby allowing reducing the manufacturing cost.

Figure 12A:
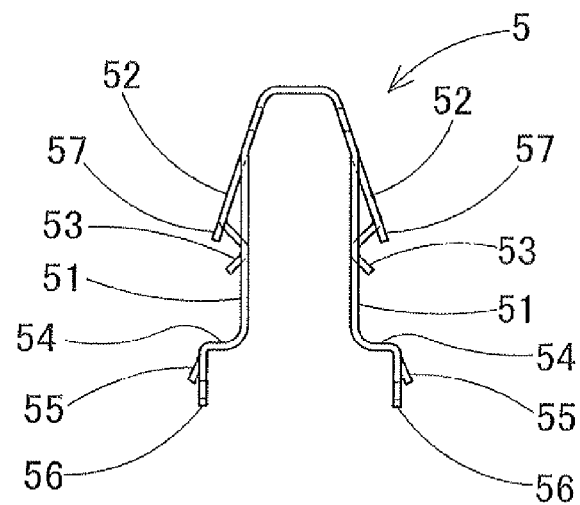
FIG. 12(a) is a side view of a mounting clip.
Figure 12B:
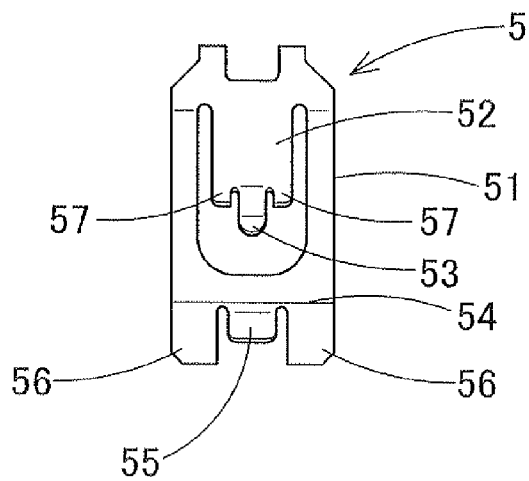
FIG. 12(b) is a plan view of the mounting clip.
Figure 12C:
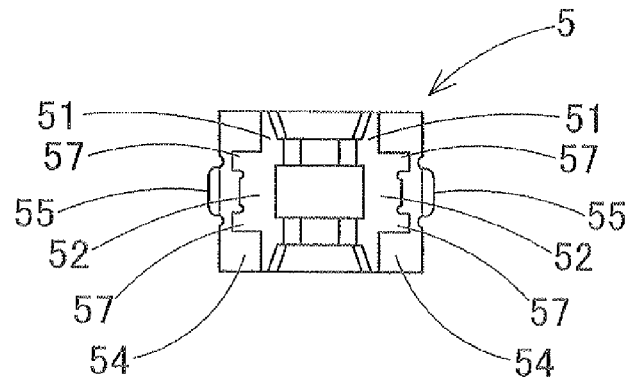
FIG. 12(c) is a rear view of the mounting clip.

As described above, the mounting clips 5 are inserted and fitted from the front side into the rectangular openings 27, 37 of the hinge bodies 21, 31, respectively, and the mounting clips 5 are each formed, as shown in FIG. 12(a) to FIG. 12(c), by bending a metal having spring resiliency into a substantially U-shape, and thus formed at both sides with resilient legs 51 having spring resiliency. Moreover, the resilient legs 51 at both sides each include a resilient bulging portion 52 formed by cutting and raising outward a part of the inner region of the leg 51 so as to project. The resilient bulging portions 52 at both sides are each formed in an elastically deformable manner so as to project outward relative to the resilient leg 51, and the resilient bulging portion 52 is formed at the leading end with a first retention portion 53 bent in a substantially laid V-shape and a second retention portion 57 in a flat plate shape, so that when the mounting clip 5 is inserted in the rectangular hole of the vehicle body panel to serve as a mounting location, the first retention portion 53 is retained by the periphery of the rectangular hole, and the leading end of the second retention portion 57 is retained by the back (inner surface) of the body panel. That is, as shown in FIG. 12(a) to FIG. 12(c), the first retention portion 53 is formed bent in a laid V-shape at the middle of a leading end portion of the resilient bulging portion 52, and the second retention portions 57 are provided on both sides of the first retention portion 53, in plate shapes parallel to the plane of the resilient bulging portion 52, in a projecting manner inclined in an oblique direction.

In addition, as the positional relationship between the first retention portion 53 and the second retention portions 57 in the mounting clip 5, as described below, the second retention portion may be arranged at the middle of the leading end of the resilient bulging portions 52, and the first retention portions may be arranged on both sides of the second retention portion, and alternatively, the first retention portion may be arranged in one half of the leading end of the resilient bulging portion 52, and the second retention portion may be arranged in the other half.

Figure 13:
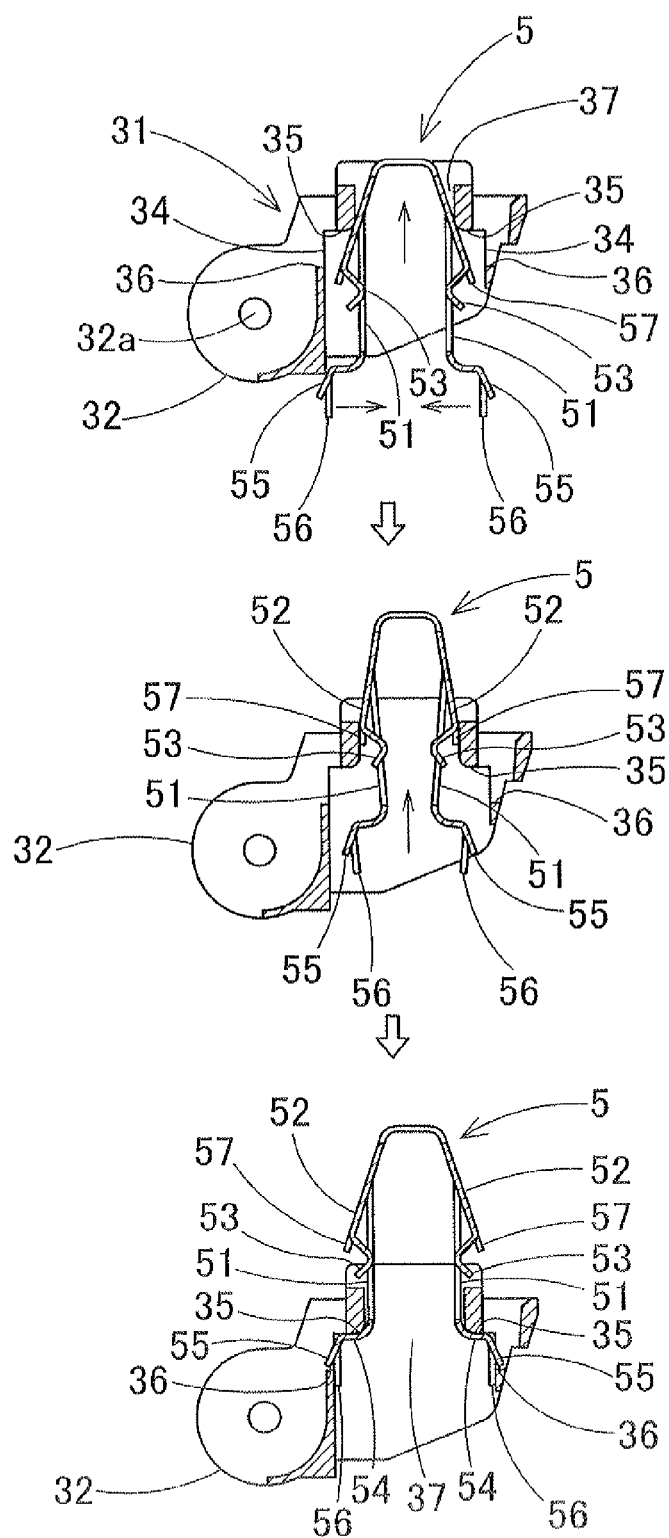
FIG. 13 is a diagram illustrating the insertion of the mounting clip into the hinge body 21 by sectional views.
Figure 14:
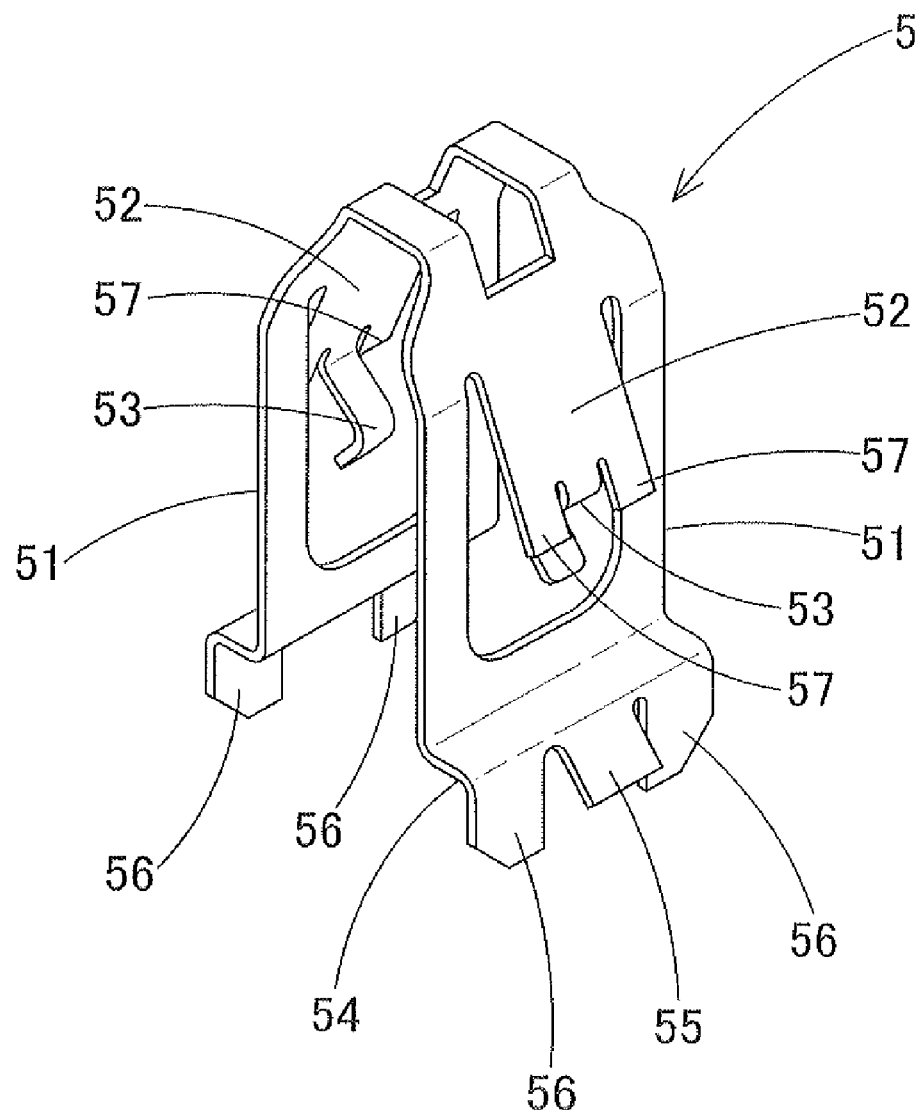
FIG. 14 is a perspective view of the mounting clip.
Figure 15A:
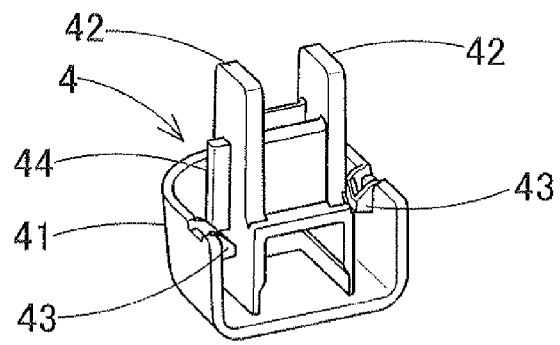
FIG. 15(a) is a perspective view from the bottom side of a cover.
Figure 15B:
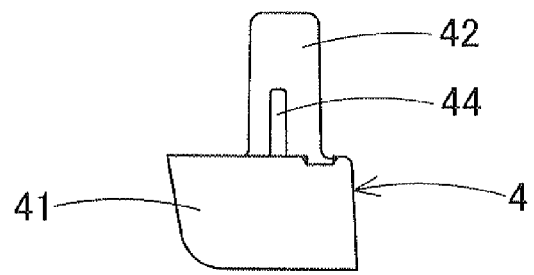
FIG. 15(b) is a right side view of the cover.
Figure 15C:
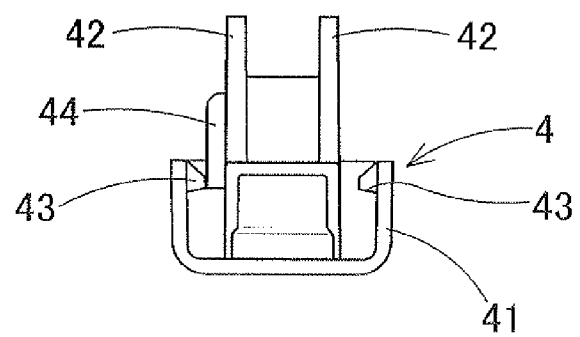
FIG. 15(c) is a plan view of the cover.
Figure 15D:
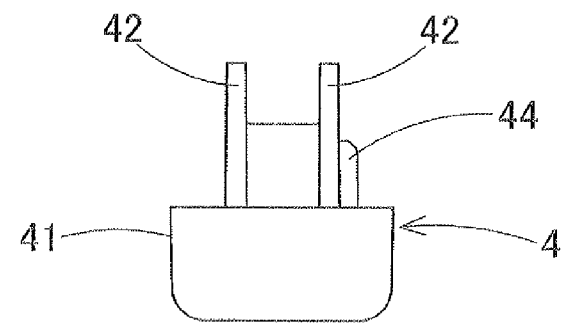
FIG. 15(d) is a front view of the cover.

As shown in FIG. 12(*a*) to FIG. 12(*c*), the resilient legs 51 at both sides each further include a stepped region 54 formed in the vicinity of the leading end and bent substantially perpendicular to the leg, and include at the leading end side of the stepped region 54 an extended region 56 extending substantially in parallel to the inserting direction of the mounting clip 5, that is, substantially in parallel to the resilient leg 51, which forms a leading end portion. The extended region 56 includes at a central part a retaining pawl 55 formed in such a manner as to cut and raise the central part to project outward. As shown in FIG. 13, when assembling the mounting clip 5 to the hinge body 31, the head of the mounting clip 5 is inserted into the rectangular opening 37 of the hinge body 31 from the front side, and the mounting clip 5 is then pushed up to the insertion end, and at this time, the stepped regions 54 at both sides of the mounting clip 5 are retained by the inner peripheral regions 35 provided at both sides of the rectangular opening 37, and the retaining pawls 55 at both sides enter the holes 34 at both sides in the rectangular opening 37 of the hinge body 31, to be held by the holding regions 36 formed at the front side of the holes 34.

FIG. 13 illustrates a state of assembling of the mounting clip 5 into the hinge body 31 of the left hinge assembly 3, and illustration of the hinge body 21 of the right hinge assembly 2 is omitted, but as shown in FIG. 11(*a*), similarly in terms also of the hinge body 21 of the right hinge assembly 2, holes 24 are formed at both sides in the rectangular opening 27 of the hinge body 21, and the stepped regions 54 of the mounting clip 5 are retained by the inner peripheral regions 25 of the holes 24. Moreover, the hinge body 21 includes holding portions 26 formed at the front side of the holes 24, so that when the mounting clip 5 is inserted into the rectangular opening 27 of the hinge body 21 from the front side, the retaining pawls 55 of the mounting clip 5 is held by the holding portions 26.

The covers 4 are assembled to the front side of the hinge bodies 21, 31 so as to cover the front of the hinge bodies 21 and 31, respectively. As shown in FIG. 5, FIG. 6, and FIG. 15(*a*) to FIG. 15(*c*), each of the covers 4 includes a main cover body 41 that covers the front of the hinge body 21, 31, and a pair of clip support portions 42 provided projecting at the back side of the main cover body 41. At the outer surface of the one of the clip support portions 42 provided projecting at both sides, as shown in FIG. 15(*a*) to FIG. 15(*c*), a guide rib 44 is provided along a push-in direction thereof, and a guide groove 21*c*, 31*c* that is fittable with the guide rib 44 is, as shown FIG. 16(*a*) to FIG. 16(*c*), etc., provided at the inside of the rectangular frame 21*a*, 31*a* of the hinge body 21, 31, that is, the inner surface of the rectangular opening 27, 37. Thus, as shown in FIG. 16(*a*) to FIG. 16(*c*), when the cover 4 is pushed in the hinge assembly 2 or 3 so as to insert the clip support portions 42 of the cover 4 into the rectangular opening 27, 37 of the hinge assembly 2 or 3, the guide rib 44 is fitted with the guide groove 21*c*, 31*c* on the hinge body 21, 31 to slide in contact, so that the cover 4 can be always appropriately fitted in without inclination.

In addition, the positional relationship between the guide groove and the guide rib may be opposite to the above, and the guide rib may be provided projecting at the inner surface of the rectangular opening 27, 37 of the hinge body 21, 31, and the guide groove may be provided on the main cover body 41 of the cover 4. Moreover, in the above, the single guide rib 44 was fitted and slid in contact with the single guide groove 21*c* or 31*c* to fit in the cover 4, but as long as the strength of a member on which guide grooves are provided is sufficient, two guide grooves or guide ribs may be provided at both inner sides of the rectangular opening 27, 37 of the hinge body 21, 31, guide ribs or guide grooves may be provided corresponding thereto at both sides of the main cover body 41 of the cover 4, so as to be fitted together and slide in contact.

On the other hand, the main cover body 41 is provided at both inner sides with engaging pawls 43 to be engaged with the cover engaging portions 29, 39 provided at both sides of the hinge body 21, 31, as shown in FIG. 15(*a*) to FIG. 15(*c*).

A torsion coil spring 6 for biasing the grip body 1 to a non-use position (state indicated by solid lines in FIG. 3) relative to the hinge assemblies 2, 3 is set between the inner support 22 and the outer support 23 of the hinge body 21 placed in the right hinge cavity 11. As shown in FIG. 5, the torsion coil spring 6 includes a first end segment 61 and a second end segment 62, and the first end segment 61 is, when the torsion coil spring 6 is set, retained in the vicinity of the inner side of the inner support 22 of the hinge body 21, and the second end segment 62 of the torsion coil spring 6 is held in a holding recess 11*a* formed in the hinge cavity 11 of the grip body 1. The torsion coil spring 6 is thus disposed between the outer support 23 and the inner support 22 of the hinge cavity 11 so as to bias the grip body 1 into a non-use state relative to the hinge body 21.

As shown in FIG. 4 and FIG. 6, an oil damper 8 is set between the inner support 32 and the outer support 33 of the hinge body 31 placed in the left hinge cavity 12. The oil damper 8 includes a cylindrical inner tube 82 and an outer tube 81 attached around the inner tube 82 in a rotatable manner, and a void space formed between the inner tube 82 and the outer tube 81 is filled with oil, so that a braking force is produced by viscosity resistance of the oil when the inner tube 82 and the outer tube 81 rotate relative to each other.

The oil damper 8 includes a shaft hole 83 formed at the axial center position of the inner tube 82, and the pivot shaft 16 is inserted through the shaft hole 83 as shown in FIG. 4. Moreover, as shown in FIG. 6, an oblong boss 84 is provided projecting at a leading-end pivoting position of the inner tube 82, so that when the oil damper 8 is inserted between the inner support 32 and the outer support 33 of the hinge body 31, the oblong boss 84 is fitted in an oblong boss recessed region 32*b* formed at the inner side of the inner support 32.

On the other hand, the oil damper 8 is provided at an outer circumference of the outer tube 81 with a linear protrusion 85 in a projecting manner, so that when the oil damper 8 is inserted between the inner support 32 and the outer support 33 of the hinge body 31, the linear protrusion 85 is engaged with a linear protrusion engaging portion 12*a* (FIG. 4) provided inside the hinge cavity 12, and when the grip body 1 is operated to rotate, the outer tube 81 of the oil damper 8 rotates together with the grip body 1. Since the hinge assembly 3 is secured to the vehicle body panel side, and the inner tube 82 of the oil damper 8 is held at the oblong boss 84 of its end portion by the inner support 32, the inner tube 82 of the oil damper 8 rotates relative to the outer tube 81 when the grip body 1 is rotated about the hinge assembly 3, so as to exert an appropriate rotational resistance.

For assembling the assist grip, first, the mounting clips 5 are assembled to the hinge bodies 21, 31 at both sides, respectively. The mounting clips 5 can be simply assembled, as shown in FIG. 13, by inserting the heads of the mounting clips 5 from the front side of the hinge bodies 21, 31 into the rectangular openings 27, 37, respectively, and pushing in the mounting clips 5 to the back side. At this time, the mounting clips 5 easily enter into the rectangular openings 27, 37 of the hinge bodies 21, 31 by only slightly flexing the resilient legs 51 inward, and at an ingress end thereof, the stepped regions 54 abut against the inner peripheral regions 25, 35 of the hinge bodies 21, 31, respectively, and the retaining pawls 55 are retained by the holding regions 26, 36 of the hinge bodies 21, 31, respectively. Thus, the mounting clips 5 are securely positioned at predetermined positions of the hinge bodies 21, 31, which prevents the mounting clips 5 from slipping toward the front side when inserting the mounting clips 5 into rectangular holes of the body panel of a vehicle body, and allows satisfactorily assembling and securing the mounting clips 5.

Subsequently, the hinge body 21 is located at a predetermined position in the hinge cavity 11 with the torsion coil spring 6 placed between the inner support 22 and the outer support 23 of the right hinge body 21, the pivot shaft 15 is inserted into the shaft hole 13 from the outside of the hinge cavity 11, and then penetrated through the torsion coil spring 6 from the shaft hole 23a of the outer support 23, and the pivot shaft 15 is further inserted through the shaft hole 22a of the inner support 22, and then the leading end of the pivot shaft 15 is inserted into the other shaft hole 13, whereby the hinge body 21 is pivotally supported relative to the grip body 1. At this time, the first end segment 61 of the torsion coil spring 6 is retained by a part of the hinge body 21, and the second end segment 62 is held in the periphery of the hinge cavity 11 of the grip body 1, so that the hinge body 21 is biased toward the hinge cavity 11 due to a spring force of the torsion coil spring 6 to enter into the hinge cavity 11.

Similarly, in the left hinge body 31, the hinge body 31 is located at a predetermined position in the hinge cavity 12 with the oil damper 8 interposed between the inner support 32 and the outer support 33, the pivot shaft 16 is inserted into the shaft hole 14 of the hinge cavity 12 from the outside, and then penetrated through the oil damper 8 from the shaft hole 33a of the outer support 33, and the pivot shaft 16 is further inserted through the shaft hole 32a of the inner support 32, and then the leading end of the pivot shaft 16 is inserted into the other shaft hole 14, whereby the hinge body 31 is pivotally supported relative to the grip body 1. At this time, the oblong boss 84 of the oil damper 8 fits in the oblong boss recessed region 32b at the inner side of the inner support 32, and the linear protrusion 85 on the outer tube of the oil damper 8 is held by the linear protrusion engaging portion 12a of the hinge cavity 12 of the grip body 1, so that rotational resistance is exerted to the hinge body 31 due to viscosity resistance of the oil of the oil damper 8.

Thereafter, the covers 4 are provisionally mounted to the front of the hinge bodies 21, 31, respectively. In the case of provisionally mounting the covers 4, as shown in FIG. 16(a) to FIG. 16(c), each cover 4 is fitted in and provisionally mounted in such a manner as inserting the clip support portion 42 provided projecting on the back side of the cover 4 up to an intermediate position in the rectangular opening 27, 37 of the hinge body 21, 31. At this time, since the guide rib 44 provided at the side of the main cover body 41 of the cover 4 is fitted and slidingly contacts the guide groove 21c, 31c at the inner surface of the rectangular opening 27, 37 for insertion, the cover 4 can be easily inserted to an appropriate position. Then, the engaging pawls 43 of the cover 4 are engaged in front of the cover engaging portions 29, 39 of the hinge body 21, 31 for provisional mounting. When the mounting clips 5 are fitted into the rectangular holes of the body panel, the covers 4 are thus mounted at the front side of the hinge bodies 21, 31 in a provisionally mounted state where the resilient bulging portions 52 and the like of the mounting clips 5 are movable.

Figure 17:
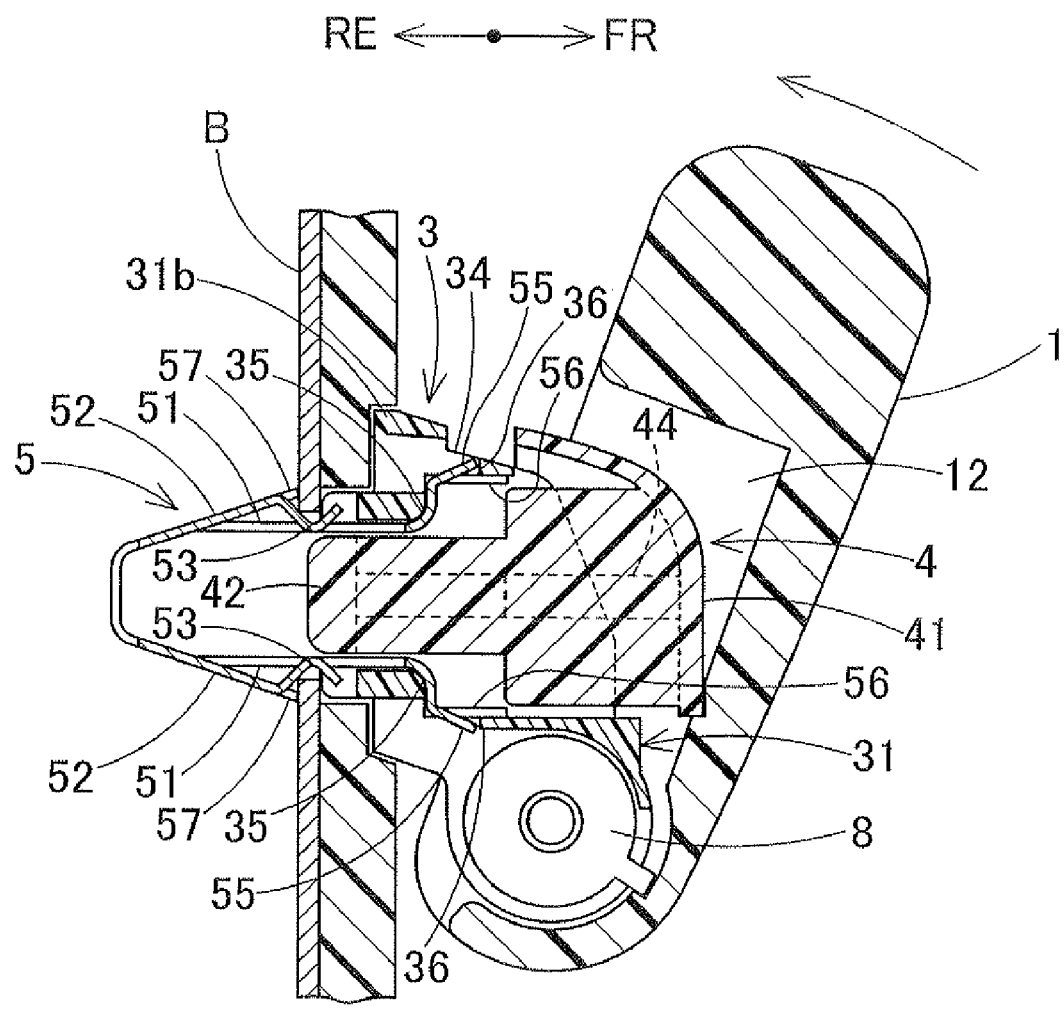
FIG. 17 is a diagram illustrating the mounting of the assist grip on a vehicle body panel by a sectional view.

When the assist grip is mounted on a predetermined location in a vehicle compartment, the grip body 1 is held to push the hinge assemblies 2 and 3 located at opposite ends thereof into rectangular holes formed on a molded ceiling covering and body panel B of the vehicle as shown in FIG. 17. At this time, the resilient bulging portions 52, 52 of the mounting clips 5, 5 provided on both of the hinge bodies 21, 31 abut against peripheries of the rectangular holes and elastically deform inward while entering into the rectangular holes, and when the resilient bulging portions 52, 52 of the mounting clips 5, 5 are completely inserted into the rectangular holes, the first retention portions 53, 53 and the second retention portions 57, 57 of the resilient bulging portions 52, 52 are elastically restored so as to open outward into a state where the first retention portions 53, 53 are held by the peripheries of the rectangular holes of the body panel B, and the leading ends of the second retention portions 57, 57 are retained by the back (inner surface) of the body panel B. Thus, it reaches a state where the peripheries of the rectangular holes of the body panel B are clamped between the seat portions 21b, 31b of the hinge bodies 21, 31 and the second retention portions 57, 57, and particularly, as a result of the second retention portions 57, 57 of the resilient bulging portions 52, 52 being held at their leading ends by the back of the body panel B, the hinge bodies 21, 31 are assembled and secured to the body panel B with an extremely high pullout resistance.

Figure 18:
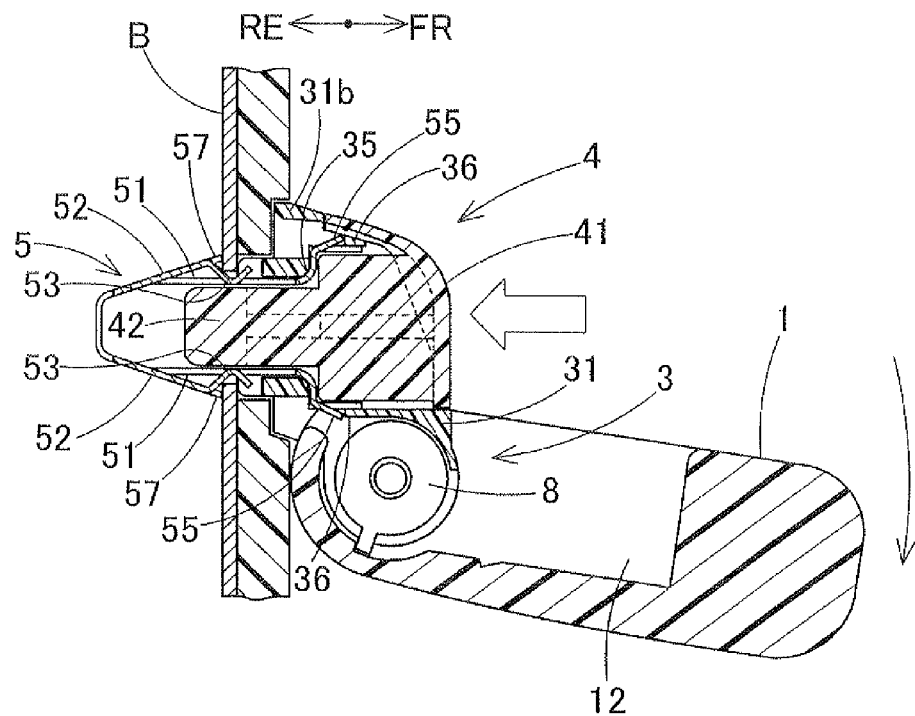
FIG. 18 is a diagram illustrating the provisionally assembled cover that has been pushed in by a sectional view.

Thereafter, the covers 4, 4 in a provisionally mounted state are, as shown in FIG. 18, pushed into interiors of the hinge bodies 21, 31 such that the engaging pawls 43 formed at the inner side thereof completely engage with the cover engaging portions 29, 39 formed at both sides of the hinge bodies 21, 31. At this time, since the guide rib 44 provided at the side of the main cover body 41 of the cover 4 is fitted and slidingly contacts the guide groove 21c, 31c at the inner surface of the rectangular opening 27, 37 of the hinge body 21, 31 and the cover 4 is pushed into the hinge body 21, 31, the cover 4 enters into the hinge body 21, 31 upright without inclination, and the engaging pawls 43 of the cover 4 are lastly engaged with the cover engaging portions 29, 39 of the hinge body 21, 31, so that the cover 4 is fitted to an appropriate position.

When pushing in the provisionally mounted cover 4, since the cover 4 is thus pushed in as a result of the guide rib 44 thereof sliding in contact within the guide groove 21c, 31c, the cover 4 appropriately enters without inclination, so that the cover 4 can be fitted with excellent workability.

Figure 19:
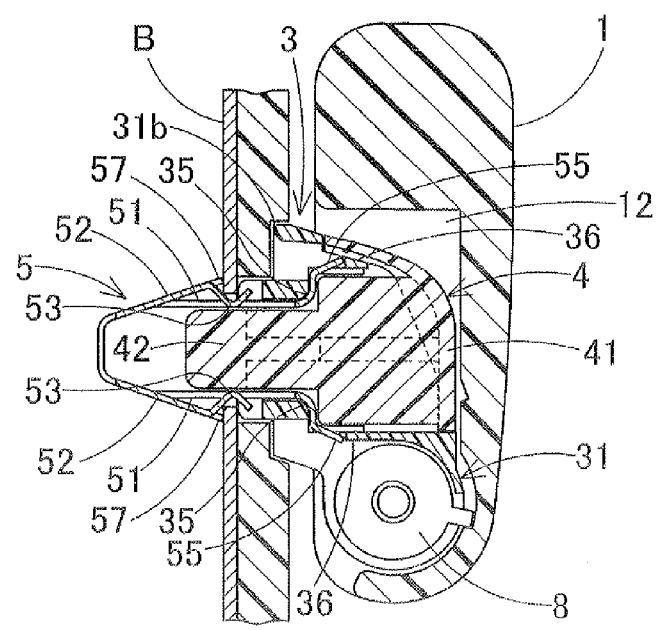
FIG. 19 is a sectional view of the assist grip in a completely mounted state on the vehicle body panel.

In this state, as shown in FIG. 19, the clip support portions 42, 42 of the covers 4, 4 completely fit in the interiors of the mounting clips 5, 5, which makes the first retention portions 53, 53 and the second retention portions 57, 57 of the resilient bulging portions 52, 52 of the mounting clips 5, 5 be tightly secured to the body panel B at mounting locations of the vehicle body structure and completes the mounting of the assist grip.

When pushing the covers 4, 4 in a provisionally assembled state into interiors of the hinge bodies 21, 31, since the guide rib 44 provided at the side of the main cover body 41 of the cover 4 is thus fitted and slidingly contacts the guide groove 21c, 31c at the inner surface of the rectangular opening 27, 37 of the hinge body 21, 31 and the cover 4 is pushed into the hinge body 21, 31, the cover 4 enters into the hinge body 21, 31 upright without inclination, that is, in a center axis direction perpendicular to the plane of the seat portion 21b, 31b of the hinge body 21, 31, so that the cover 4 is never locked in the middle, and the cover 4 can be fitted to an appropriate position with excellent workability.

Moreover, since the leading ends of the second retention portions 57, 57 of the resilient bulging portions 52, 52 of the mounting clip 5 are retained by the back (inner surface) of the body panel B with the hinge bodies 21, 31 assembled to the body panel B, the hinge bodies 21, 31 can be secured to the body panel B with an extremely high pull-out resistance. Moreover, since the first retention portions 53, 53 at both sides of the mounting clip 5 are held by the peripheries of the rectangular holes of the body panel B, the hinge bodies 21, 31 are appropriately positioned when being fitted into the rectangular holes, so that the hinge bodies 21, 31 can be secured to the body panel B without misalignment or rattling.

For using the assist grip, a user rotates the grip body 1 to the lower side about the hinge assemblies 2, 3 to use the assist grip as shown in FIG. 3. The grip body 1 is pulled downward at its central region by the user, and at this time, the torsion coil spring 6 is twisted at the second end segment 62 against its torsion spring force by a rotation of the holding recess 11*a* of the hinge cavity 11 in the grip body 1. Thus the grip body 1 rotates to the lower side against the torsion spring force, and the grip body 1 is kept in an in-use state by the user gripping the grip body 1.

On the other hand, when the user releases his/her hand from the grip body 1 in an in-use state of the assist grip, the grip body 1 rotates upward due to an upward (clockwise, in FIG. 3) biasing force exerted by the second end segment 62 of the torsion coil spring 6 and returns into a non-use state (the position indicated by solid lines in FIG. 3), and at this time, the oil damper 8 acts to brake the rotation of the grip body 1, so that the grip body 1 returns to the non-use position at low speed.

Figure 20A:
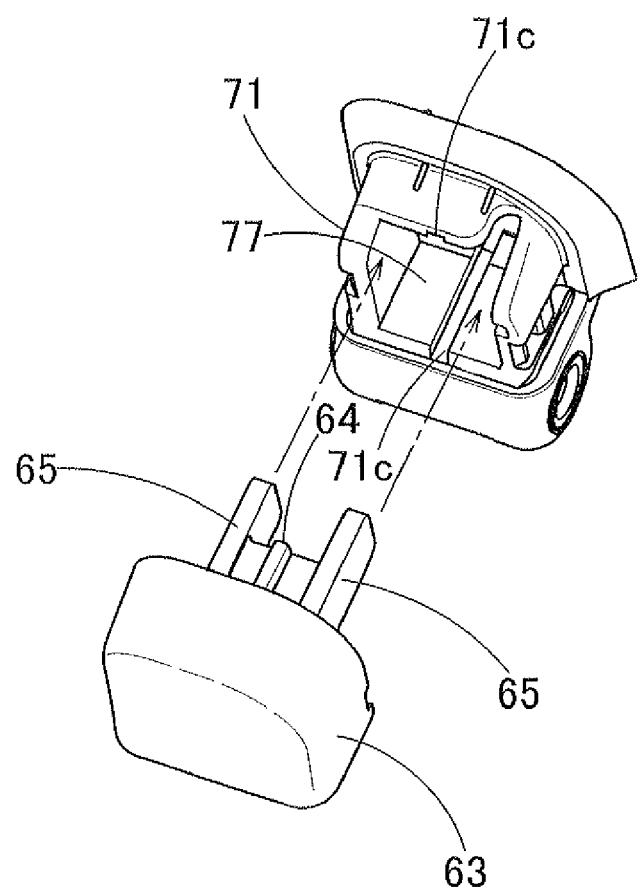
FIG. 20(a) is a perspective view of a hinge body and a cover.
Figure 20B:
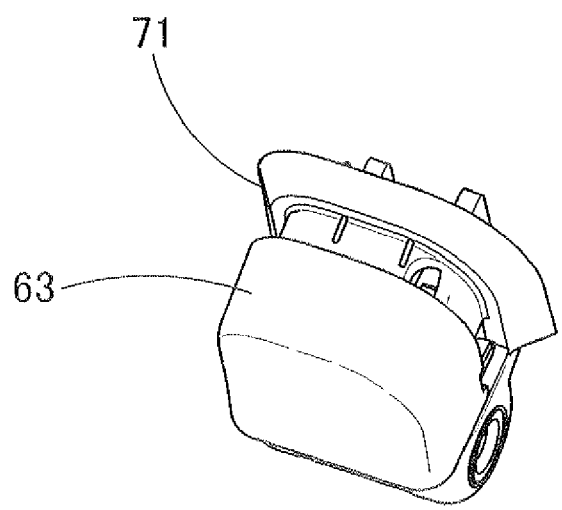
FIG. 20(b) is a perspective view of the cover in a provisionally assembled state relative to the hinge body.

FIG. 20(*a*) and FIG. 20(*b*) show another embodiment of the above-described guide grooves and guide ribs. In this example, as shown in FIG. 20(*a*) and FIG. 20(*b*), guide ribs 64 are provided projecting along the inserting direction at upper and lower inner surfaces of a main cover body 63 connecting clip support portions 65, 65, and at corresponding positions of the upper and lower surfaces in a rectangular opening 77 of a hinge body 71, guide grooves 71*c* are provided. Even with the guide ribs 64 and guide grooves 71*c* in such a positional relationship, when the cover is pushed into the hinge body 71, the guide ribs 64 can be fitted and made to slidingly contact the guide grooves 71*c*, respectively, to fit the cover into the hinge body 71 easily and appropriately.

Figure 21:
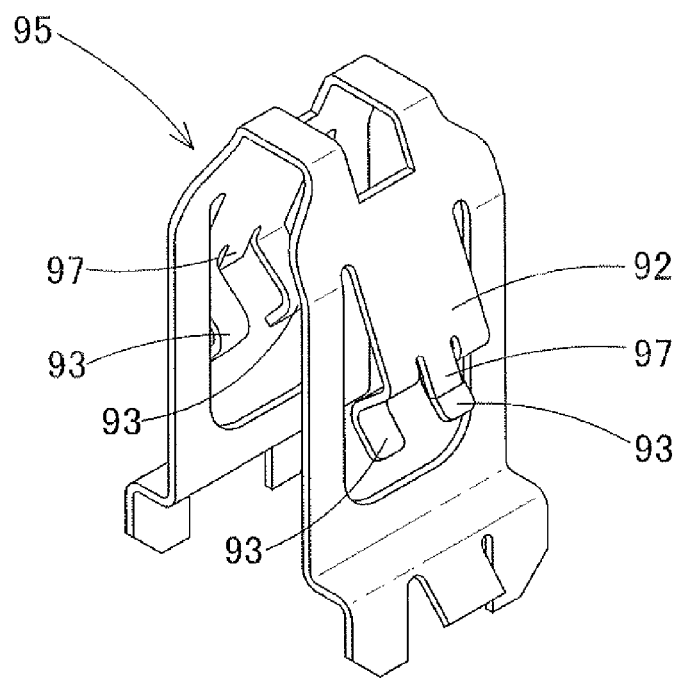
FIG. 21 is a perspective view of a mounting clip of another embodiment.

FIG. 21 shows a mounting clip 95 of another embodiment. In the mounting clip 95 of this example, at the middle of the leading end of each of the resilient bulging portions 92 bulging at both sides thereof, a flat plate-shaped second retention portion 97 is arranged, and first retention portions 93 bent in a laid V-shape are arranged adjacently at both sides of the second retention portion 97. Even by using the mounting clip 95 having the resilient bulging portion 92 with such first retention portions 93 and second retention portion 97, the hinge body 21, 31 can be assembled to the body panel B with a high pull-out resistance retained in the same manner as the above.

Figure 22:
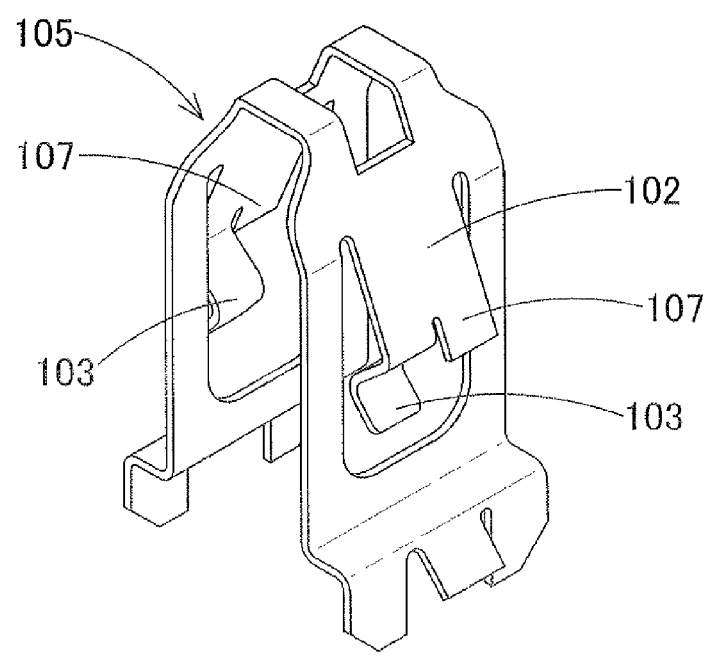
FIG. 22 is a perspective view of a mounting clip of still another embodiment.

FIG. 22 shows a mounting clip 105 of still another embodiment. In the mounting clip 105 of this example, at one side of the leading end of each of the resilient bulging portions 102 bulging at both sides thereof, a flat plate-shaped second retention portion 107 is arranged, and a first retention portion 103 bent in a laid V-shape is arranged at the other side of the leading end. Even by using the mounting clip 105 having the resilient bulging portions 102 with such a first retention portion 103 and second retention portion 107, the hinge body 21, 31 can be assembled to the body panel B with a high pull-out resistance retained in the same manner as the above.

The invention claimed is:

1. An assist grip comprising:
a grip body including hinge cavities on bases provided at opposite left and right ends;
hinge assemblies including a pair of hinge bodies to be pivotally connected to the hinge cavities at opposite sides thereof via pivot shafts;
mounting clips each comprising metal having spring resiliency and bent into a substantially U-shape with resilient legs provided at both sides, the resilient legs at both sides including resilient portions bulging outward, and the mounting clips to be respectively inserted into rectangular openings provided substantially at the center of the pair of hinge bodies;
covers each including a clip support portion inserted into the inside of the resilient legs at both sides of the mounting clip, and fitted to the hinge body so as to cover a front surface of the hinge assembly, the cover being pushed into the hinge body from the front to the back side; and
a guide groove and a guide rib fitted together to slidingly contact along a push-in direction where the hinge body and the cover slidingly contact when the cover is pushed into the hinge body.

2. The assist grip as set forth in claim 1, wherein the guide groove is formed along a push-in direction on an inner side surface of a rectangular frame of the hinge body, and the guide rib is formed on a side surface of the clip support portion of the cover or an inner side surface of a cover main body of the cover.

3. The assist grip as set forth in claim 1, wherein the guide grooves are formed along a push-in direction on both inner side surface of a rectangular frame of the hinge body, and the guide ribs are formed on both side surface of the clip support portion of the cover or both inner side surfaces of a cover main body of the cover.

* * * * *